United States Patent
Servant

(10) Patent No.: US 8,152,438 B2
(45) Date of Patent: Apr. 10, 2012

(54) INSTALLING A SHAFT IN A BEARING COMPRISING A SELF-RELEASING NUT

(75) Inventor: Regis Eugene Henri Servant, Vigneux sur Seine (FR)

(73) Assignee: SNECMA, Paris (FR)

( * ) Notice: Subject to any disclaimer, the term of this patent is extended or adjusted under 35 U.S.C. 154(b) by 960 days.

(21) Appl. No.: 12/145,006

(22) Filed: Jun. 24, 2008

(65) Prior Publication Data

US 2008/0317594 A1 Dec. 25, 2008

(30) Foreign Application Priority Data

Jun. 25, 2007 (FR) ..................................... 07 04544

(51) Int. Cl.
*F04D 29/054* (2006.01)
(52) U.S. Cl. ......... 415/1; 415/216.1; 415/229; 403/243; 403/351; 403/12
(58) Field of Classification Search ............... 415/216.1, 415/229, 1; 403/243, 351, 404, 12
See application file for complete search history.

(56) References Cited

U.S. PATENT DOCUMENTS

| | | | |
|---|---|---|---|
| 4,452,567 A * | 6/1984 | Treby et al. ................. 416/2 | |
| 6,338,578 B1 | 1/2002 | Adde et al. | |
| 6,783,319 B2 * | 8/2004 | Doerflein et al. ................ 415/1 | |
| 6,827,548 B2 * | 12/2004 | Coxhead et al. ................ 415/9 | |
| 7,097,413 B2 * | 8/2006 | VanDuyn ........................ 415/9 | |
| 7,493,753 B2 * | 2/2009 | Moniz et al. .................... 60/268 | |
| 7,883,311 B2 * | 2/2011 | Moniz et al. .................... 415/1 | |
| 2003/0039538 A1 * | 2/2003 | Allmon et al. .................. 415/1 | |
| 2003/0143063 A1 * | 7/2003 | Coxhead et al. ................ 415/9 | |
| 2005/0013696 A1 | 1/2005 | Le Jeune et al. | |
| 2006/0291955 A1 * | 12/2006 | Maffre ....................... 403/359.1 | |

FOREIGN PATENT DOCUMENTS

| | | |
|---|---|---|
| EP | 0 987 457 A1 | 3/2000 |
| EP | 1 498 624 A1 | 1/2005 |
| GB | 802263 | 10/1958 |

* cited by examiner

*Primary Examiner* — George Fourson, III
(74) *Attorney, Agent, or Firm* — Oblon, Spivak, McClelland, Maier & Neustadt, L.L.P.

(57) ABSTRACT

A gas turbine engine including a shaft, a bearing, a coupling supported by the bearing is disclosed. The shaft is engaged by an end trunnion inside the coupling and fixed to the coupling by a cylindrical nut. The engine is characterized in that the nut is in axial abutment in a first direction against the coupling and the trunnion is screwed onto the nut. A slotted stop ring housed in an annular groove of the nut forms an axial abutment in the direction opposing the first direction, so as to allow the removal of the trunnion from the coupling by unscrewing the nut.

12 Claims, 8 Drawing Sheets

INSTALLING A SHAFT IN A BEARING COMPRISING A SELF-RELEASING NUT

BACKGROUND OF THE INVENTION

1. Field of the Invention

The present invention relates to a gas turbine engine in the aviation field and relates to the installation of a shaft inside the engine, more particularly the upstream end of the high pressure compressor shaft in a double-bodied engine.

2. Description of the Related Art

The operations for installing and removing turbo engines are awkward due to the number of parts which they comprise and the small clearances therebetween, whilst the dimensions may be considerable. The cost of working on engines of this type is, as a result, always high. The aim, therefore, is continually to simplify them. In a front, double-bodied turbofan engine, such as the cfm56 engine, the access to the bearing supporting the high pressure compressor shaft is particularly difficult as it is installed in the region of the intermediate casing behind the fan and the first two bearings supporting respectively the low pressure compressor shaft and that of the fan.

It will be recalled that the term: "intermediate casing" denotes the element of the structural stator behind the casing of the fan through which passes a portion of the forces between the engine and the aircraft and which supports the front bearings of the rotors. The intermediate casing comprises a hub designed to support the bearings including the front bearing of the shaft of the high pressure rotor. The hub is connected to an external ferrule by radial arms which pass through the primary and secondary flows. The bearing of the HP compressor supports in rotation the front end of the HP compressor shaft. In front of this shaft, in its axial extension, is mounted a bevel pinion which meshes with a bevel pinion integral with a radial shaft. These pinions together form the IGB (intermediate gear box). The radial shaft drives at its radial external end, on the casing of the fan, the gears of the gear box, denoted AGB (accessories gear box), for mechanically driving the auxiliary equipment of the engine: pumps, electrical current generators or the like.

In order to avoid dismantling the whole front part of the engine and the fan in particular, the elements of the bearing are designed so as to allow installation from the rear. Such a solution is advantageous but requires care.

One known solution on a double-bodied turbofan engine uses a complex system, comprising numerous parts, which is difficult to manufacture and to install. This solution requires, moreover, a considerable length of time for its installation which is not compatible with small-sized engines.

Moreover, this known solution is not compatible with a centrifugal scoop system of lubrication.

BRIEF SUMMARY OF THE INVENTION

The problem to be solved relates, therefore, to a type of connection between the HP compressor shaft, the IGB and the bearing making it possible to install and remove the HP compressor with sole access for tools from the rear of the engine.

The subject of the invention is also a compact connection which is inserted into the space available without it being necessary to modify the surrounding parts or to reduce the clearance with the low pressure turbine shaft. Such clearance is necessary when decoupling the bearings of the fan when a blade has been lost, for example, and for the ventilation of the engine.

More generally, the invention relates to a gas turbine engine comprising a shaft, a bearing, a coupling supported by the bearing, the shaft being engaged by an end trunnion inside the coupling and fixed to the coupling by means of a cylindrical nut.

According to the invention, it is possible to implement the subjects targeted above with an engine wherein the nut is housed inside the trunnion and abuts in a first axial direction against the coupling, when the trunnion is screwed onto the nut, and a slotted stop ring housed in an annular groove formed on the external face of the nut forms an axial abutment against the coupling in the axial direction opposing the first direction, allowing the removal of the trunnion by unscrewing the nut.

The nut is, therefore, of the self-releasing type and makes it possible to simplify the sequence of installation/removal of the engine. The parts of the engine thus constitute part of the tools required for this sequence. The engine, therefore, permanently incorporates the most critical part of these tools which simplifies the remainder of the tools which have to be available in any maintenance workshop.

In order to permit the positioning of the slotted stop ring, its thickness is less than the radial spacing formed between the nut and the coupling.

Preferably, the surface of the slotted stop ring on the side of the surface of the axial abutment of the coupling and the axial abutment surface of the coupling are truncated, so as to prevent the opening of the slotted stop ring under axial force when the ring is in abutment against the axial abutment surface of the coupling.

Advantageously, the slotted stop ring comprises on the side opposing the previous side a cylindrical extension forming a positioner.

In order to ensure the holding of the slotted stop ring in said groove, the trunnion comprises a cylindrical end portion covering the slotted stop ring.

The invention preferably applies to the case where the coupling is a mechanical power take-off bevel pinion for driving the auxiliary equipment, and more particularly to the case where the shaft is the high pressure compressor shaft in a double-bodied engine.

This solution makes it possible to remove the high pressure compressor in a simple manner by working solely from the rear of the engine and does not compromise the tools and installation means currently used.

The installation/removal of the engine from the rear is very advantageous and greatly reduces the cost of this operation.

The invention has a particular advantage when the trunnion of the shaft of the compressor is shrink-fitted inside the bevel pinion. By the term "shrink fitted" is understood in this case that the trunnion and the bevel pinion are sufficiently clamped inside one another so that during the operation of the engine there is no slippage between the pinion and the trunnion, which might cause premature wear of the mating surfaces (fretting).

The invention also relates, therefore, to the method for installation and removal.

The method for installing the high pressure compressor shaft in said bearing of the engine comprises the following steps:

- installing the nut in the pinion,
- inserting the stop ring into the groove of the nut,
- axial flanging of the nut,
- engaging the upstream end trunnion of the high pressure compressor shaft,
- screwing the nut inside the trunnion whilst exerting an axial thrust on the shaft until brought into abutment.

If required, the method comprises the step of heating the bevel gear before the engagement of the end portion of the compressor shaft.

The method of removing the high pressure compressor shaft from said bearing of the engine comprising the following steps:
- axial locking of the end trunnion of the compressor shaft,
- unscrewing the nut until the stop ring is in abutment against the pinion,
- axial flanging of the nut,
- unscrewing the nut until completely disengaging the end portion of the compressor shaft, whilst exerting an axial thrust on the shaft in order to relieve the threaded portion.

BRIEF DESCRIPTION OF THE SEVERAL VIEWS OF THE DRAWINGS

Further advantages and features will become apparent from reading the following description, provided in more detail by referring to the accompanying drawings, in which.

DETAILED DESCRIPTION OF THE INVENTION

Figure 1:
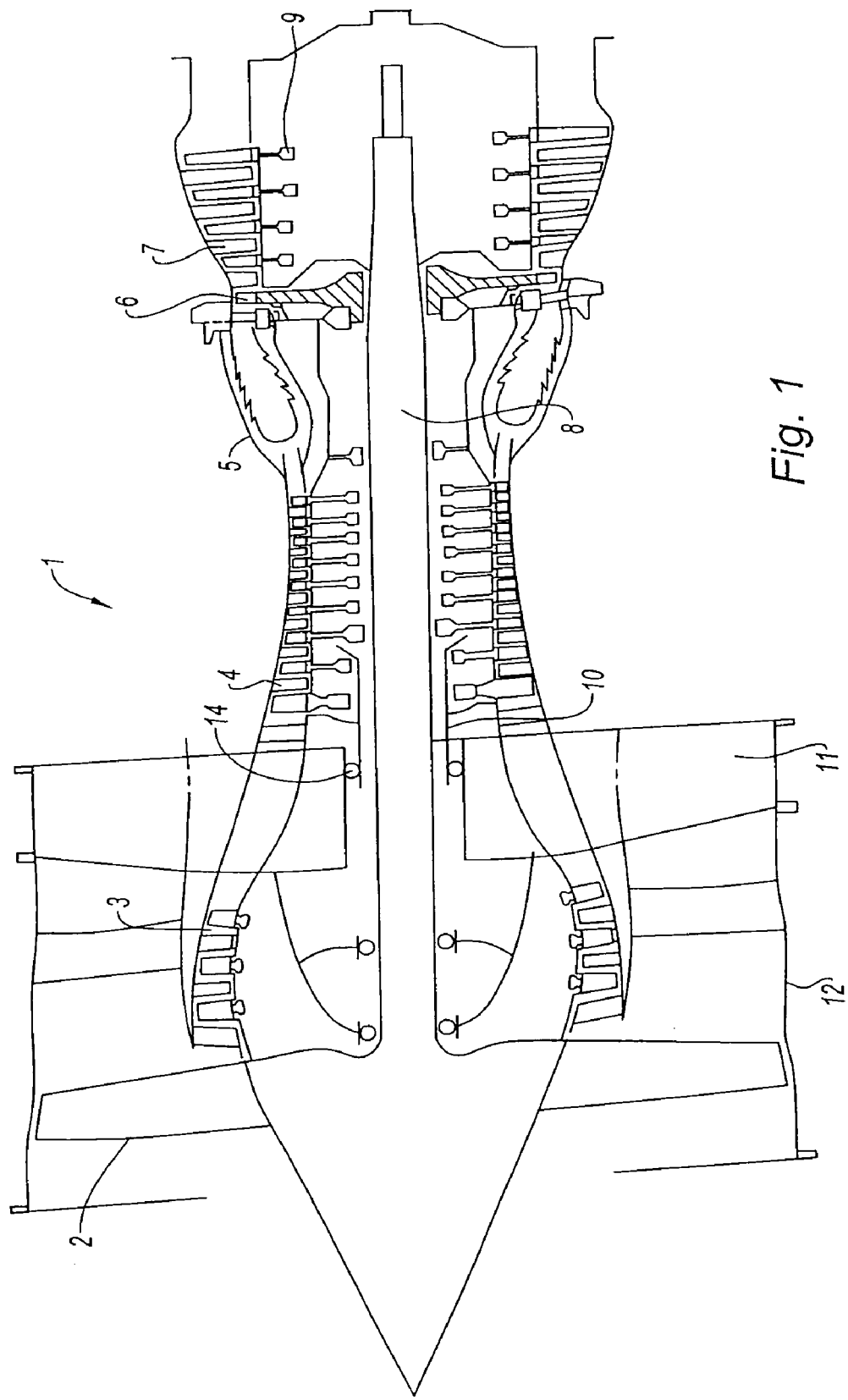
FIG. 1 shows an axial section of a gas turbine engine, of the twin flow and double-bodied turbofan type.

The engine shown in FIG. 1 comprises, from upstream to downstream relative to the gaseous flows, the following mechanical elements: a front fan 2, a low pressure compressor 3, a high pressure compressor 4, a combustion chamber 5, a high pressure turbine stage 6 receiving the gases of the combustion chamber, a low pressure turbine module 7. The fan 2, the low pressure compressor 3 and the low pressure turbine form a rotor which is integral with a shaft 8 arranged on the axis of the engine. The compressor 4 and the high pressure turbine 6 form a second rotor 9 independent of the first and mounted by being concentric to the shaft 8 of the first rotor. The engine is contained in a casing assembly including upstream the intermediate casing 11 arranged downstream of the fan casing 12. The intermediate casing 11 supports front bearings of the two rotors, including in particular the support bearing of the upstream end trunnion 10 of the rotor 9 of the high pressure body. The operation of the engine 1 is as follows: the air drawn in by the fan 2 is divided into two concentric flows: a primary flow and a secondary flow. The secondary flow is ejected into the atmosphere and provides the majority of the thrust. The primary flow is guided through the compressors 3 and 4, then into the combustion chamber 5 where it is mixed with a fuel. The pressure of the high energy gases from the combustion chamber is successively reduced in the turbines 6 and 7 and sets said turbines in motion. The turbines drive, in turn, their associated compressor. The gases of the primary flow are ejected downstream and contribute to the thrust provided by the engine.

Figure 2:
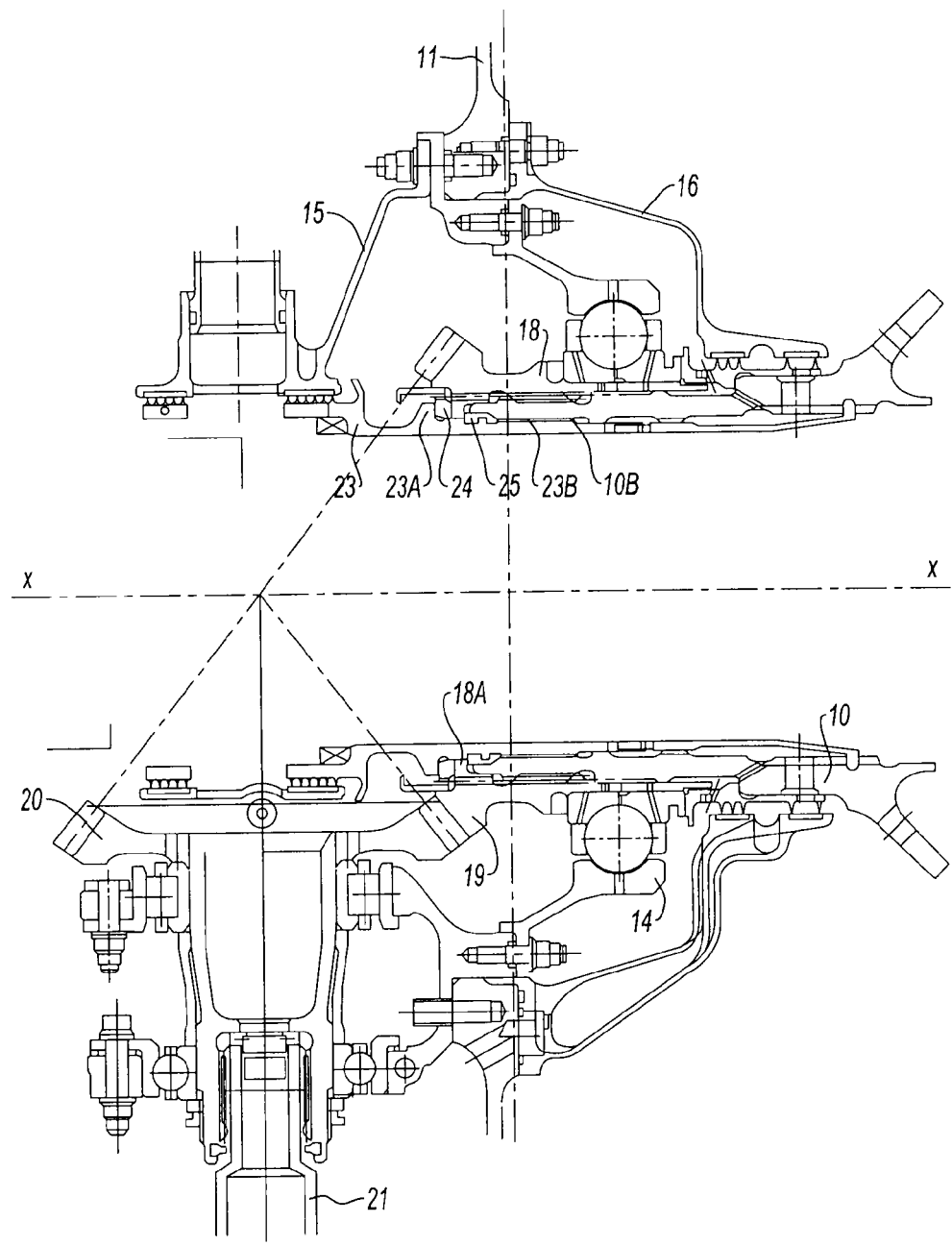
FIG. 2 shows an axial section of the zone of the bearing supporting the end trunnion of the compressor shaft.

FIG. 2 shows in more detail the inside of the hub of the intermediate casing.

The intermediate casing 11 supports the rolling bearing 14. This bearing is denoted as a whole as bearing number three as it is the third bearing from upstream of the engine. Bearings one and two support the fan shaft and low pressure compressor shaft.

The ball bearing 14 is enclosed in a housing made by a upstream sealing flange 15 and a downstream sealing flange 16. The bearing 14 supports a coupling 18 which is integral with a bevel gear 19. The bevel gear comprises teeth arranged on a conical surface and which cooperate with the teeth of a bevel pinion 20 arranged substantially perpendicular to the axis XX of the engine. The pinion is integral with a radial shaft 21 of which only one part is shown. This shaft extends as far as the fan casing where it is attached to a gear box, AGB, for driving the auxiliary equipment of the engine.

The end trunnion 10 of the high pressure compressor shaft is retained inside the coupling 18 by a cylindrical nut 23.

The nut of generally cylindrical shape is screwed inside the trunnion 10. It abuts in a first axial downstream direction by means of an external radial collar 23A against a transverse surface 18A of the coupling 18. In the present case, a centrifugal oil scoop 24 is interposed between the two surfaces 23A and 10B. The nut comprises a threaded portion 23B on its external surface cooperating with an internal threaded portion 10B of the trunnion 10.

Figure 3:
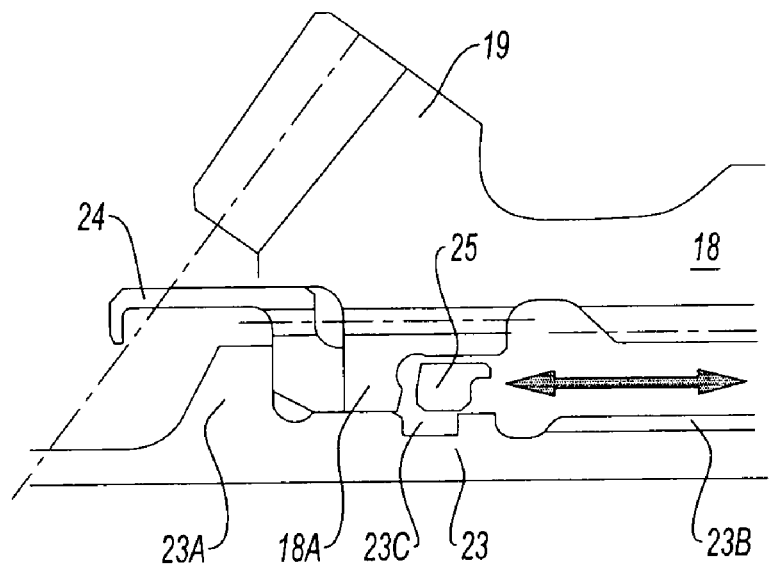
FIG. 3 shows an enlarged view of the nut positioned on the bevel gear, the slotted stop ring being in the course of installation.
Figure 4:
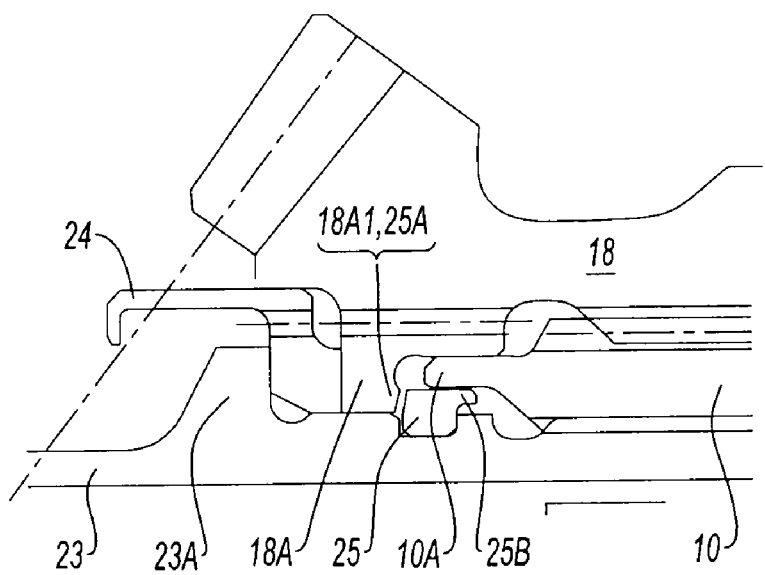
FIG. 4 shows the same view as FIG. 3 with the end trunnion of the compressor in position.

A slotted stop ring 25 made of steel is housed in an annular groove 23C machined on the external surface of the nut 23. FIG. 3 shows the positioning of the ring 25 which is slid according to the arrow F into the annular space between the nut 23 and the coupling 18 before screwing on the trunnion 10. The thickness of the ring is determined so as to allow the passage thereof. FIG. 4 shows the trunnion 10 after the nut 23 has been screwed on. The trunnion comprises a cylindrical end portion 10A which covers the ring 25. This arrangement ensures the locking of the ring during the operation of the engine by holding it in the groove 23C.

The faces of the internal radial collar 18A and of the ring 25 which are liable to come into contact, respectively 18A1 and 25A, are truncated.

The ring 25 comprises a flange with an axial extension 25B which has a positioning function in the event that it is installed in reverse. More specifically, the extension 25B might come into abutment against the rounded surface portion above the portion 18A1 which might prevent the introduction of the ring into the groove 23C. The flange also facilitates the gripping of the slotted stop ring by a tool during the dismantling thereof.

The installation of the trunnion in the bearing is illustrated by FIGS. 5 to 9 which illustrate the different phases thereof.

Figure 5:
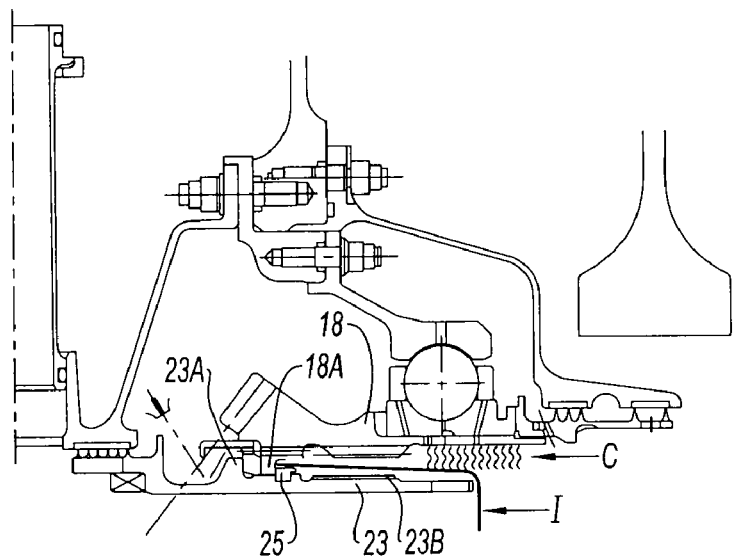
FIG. 5 shows the preparation for the installation of the trunnion of the compressor in the bearing with the bearing being heated.

In FIG. 5, the nut 23 has been positioned in the coupling 18, in abutment against the radial collar 18A of the coupling. The ring 25 has been introduced along the space between the nut and the coupling and slid into the groove 23C. The process is started by heating at C the coupling and the bevel gear in the bearing to reduce the forces of subsequent shrink-fitting. A thermal protection T covers the nut so that, in particular, its threaded portion 23B is not heated up.

Figure 6:
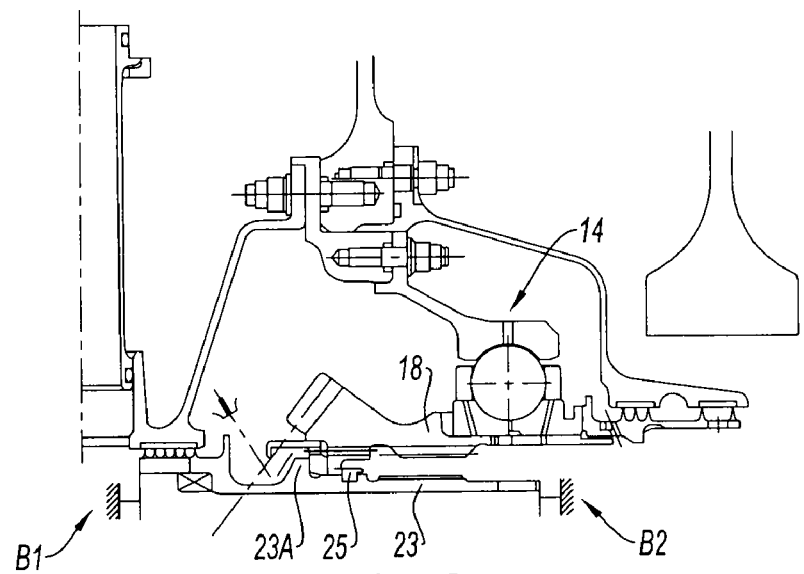
FIGS. 6 to 9 show four steps of installing the trunnion of the compressor in the bearing.

The following step, in FIG. 6, consists in axially flanging the nut, both upstream B1 and downstream B2, over a fixed part of the tool, so that the axial installation forces do not pass through the rolling bearing 3. This could lead to the marking of the bearing races by the balls, thus reducing the duration of the life of this bearing.

Figure 7:
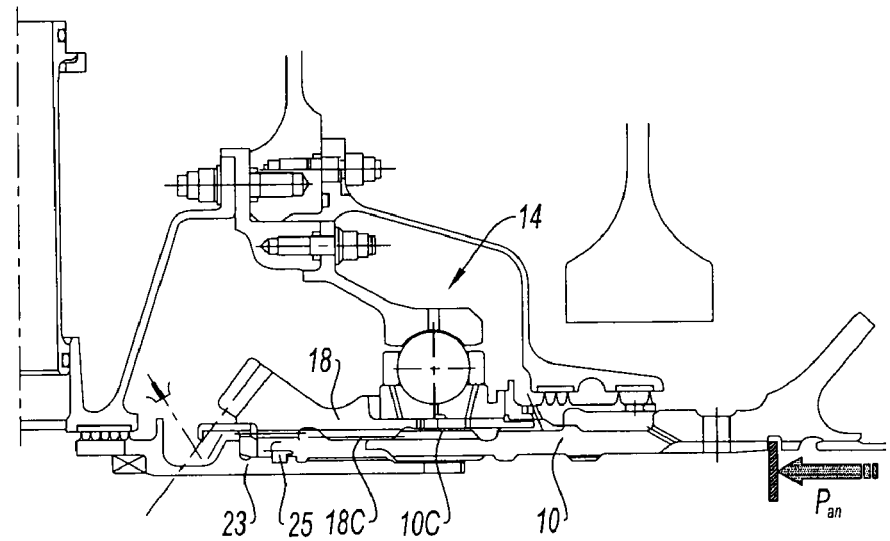
Figure 8:
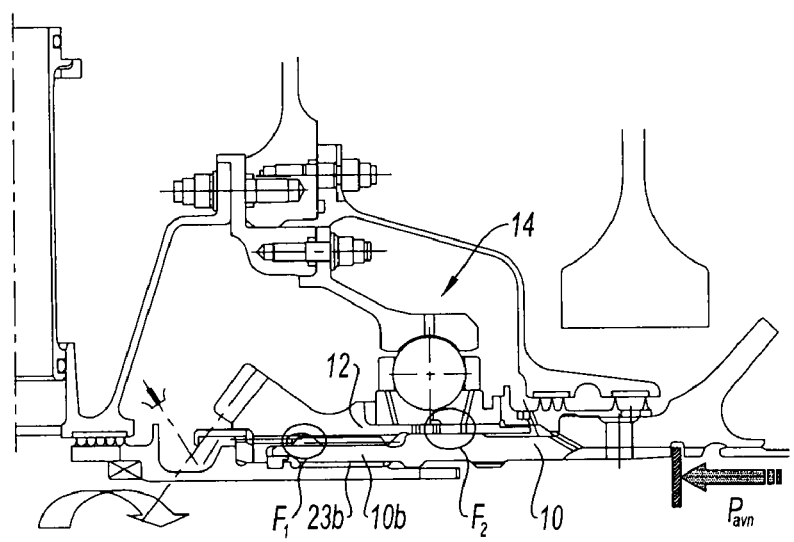

It is possible, therefore, in FIG. 7, to engage the end trunnion 10 of the high pressure compressor, until it is in contact with the splines, respectively 10C and 18C. The splines have been, moreover, indexed and the bevel gear immobilized by a radial stub shaft. The trunnion is pushed in the direction of the nut, with an additional upstream thrust Pam provided by the tool.

The engagement of the trunnion in the splines is continued until in contact with the threaded portions, respectively 23B and 10B.

Initially, therefore, the nut is screwed whilst exerting an additional upstream thrust Pam provided by the tools so as to relieve the thread. The nut is screwed until in abutment at D with the trunnion 10, FIG. 8, so as to ensure a satisfactory connection by shrink-fitting between the trunnion 10 and the coupling 18 of the bevel gear 19, and two shrink-fitted zones are made, one F1 in the region of the bevel gear, the other F2 in the region of the rolling bearing.

Figure 9:
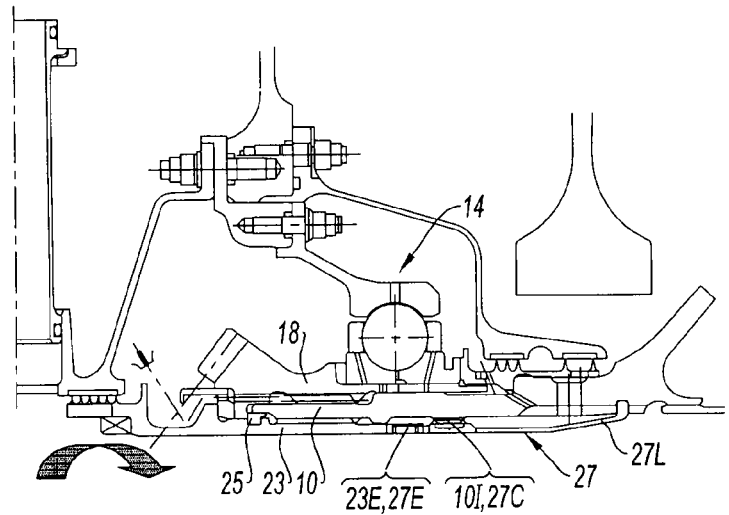

After applying a tightening torque a nut lock 27 is positioned, FIG. 9. The lock comprises a cylindrical part with studs 27E which cooperate with notches 23E at the end of the nut 23 and with splines 27C which cooperate with internal splines 10I of the trunnion. The lock comprises tongues 27L, at the downstream end of the flexible tabs 27 which are introduced into an internal groove 10F of the trunnion 10. In this manner, said lock prevents any rotation of the nut in the unscrewing direction.

The removal comprises the following operations.

Figure 10:
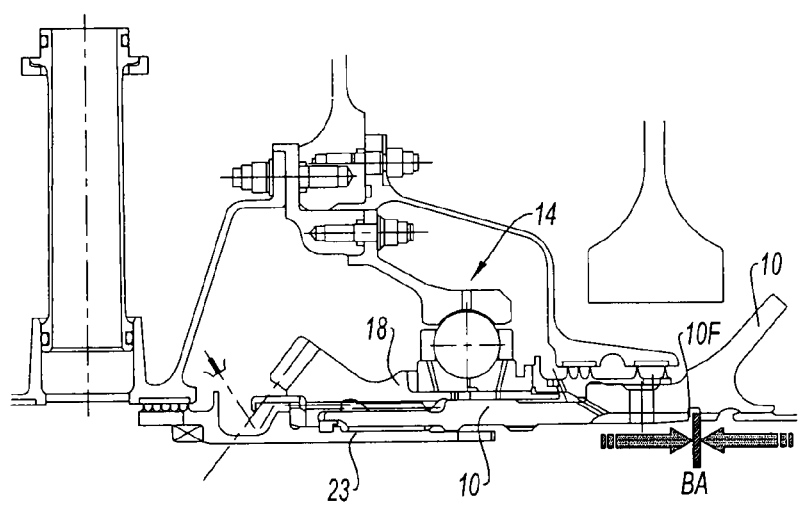
FIGS. 10 to 13 show three steps of removing the trunnion of the compressor.

The lock 27 is removed and the trunnion is axially locked at BA, FIG. 10. The groove 10F released by the nut lock is utilized to this end.

Figure 11:
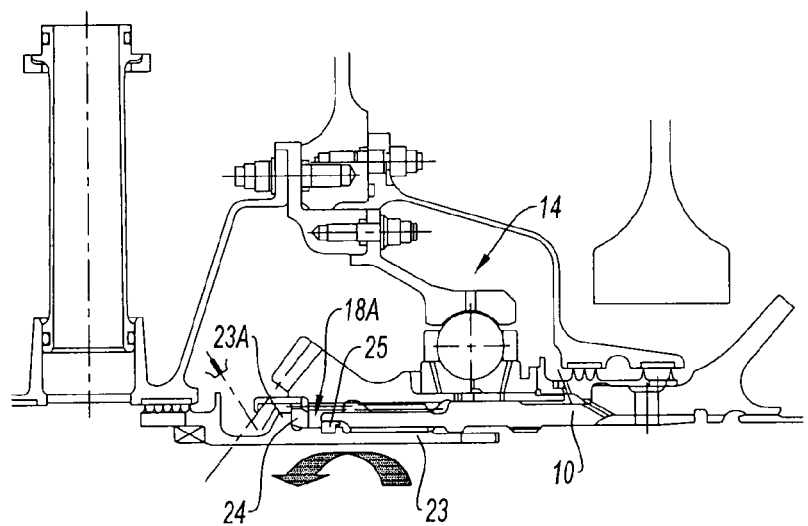

The nut 23 is unscrewed, and is displaced upstream until the stop ring 25 is brought into contact on the downstream face of the radial internal collar 18A of the pinion, FIG. 11.

Figure 12:
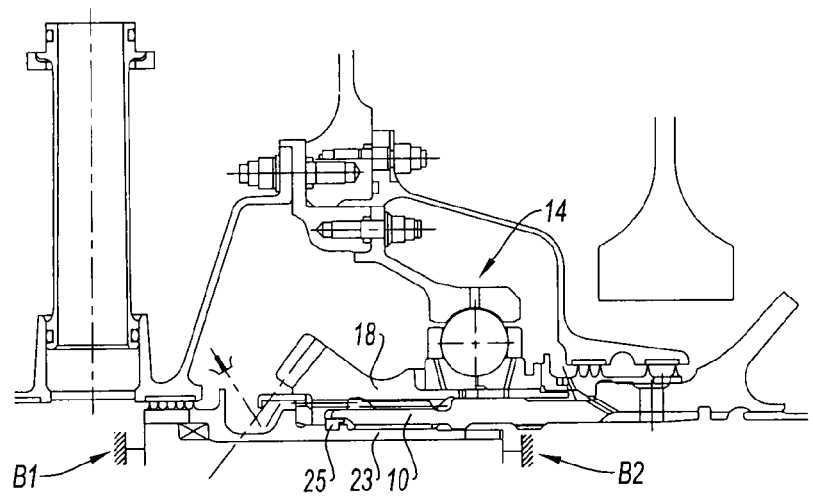

The nut 23 is axially flanged on both sides, at B1 and B2, as for the installation, over a fixed part of the tool, FIG. 12. This precaution prevents the significant unshrinking forces from passing through the bearing 3.

Figure 13:
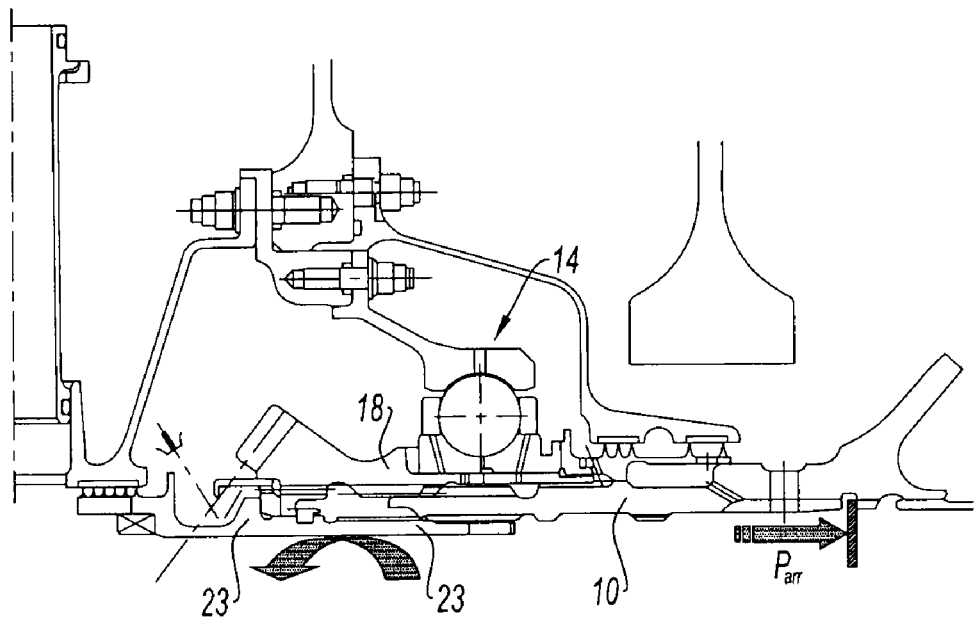

The nut is unscrewed until complete disengagement of the trunnion, FIG. 13. An additional thrust Parr to the rear, provided by the tool, relieves the thread. It is noteworthy that the unshrinking forces are very high, since there is no thermal differential between the coupling of the bevel gear and the trunnion 10. The conical orientation of the contact faces 18A1 and 25A prevents the ring from opening and emerging from the groove 23C.

The force required for unshrinking the shaft, representing several tons, passes entirely into the threaded portion between the nut of the bearing and the trunnion of the compressor shaft if the tool used does not relieve it of part of the force. Moreover, the tool has to provide the required axial abutments so that the installation/removal forces are not allowed to pass into the bearing 3 which could damage the bearing races.

The invention claimed is:

1. A gas turbine engine comprising:
   a shaft;
   a bearing; and
   a coupling supported by the bearing, the shaft being engaged by an end trunnion inside the coupling and fixed to the coupling by means of a cylindrical nut,
   wherein the nut is housed inside the trunnion and is in axial abutment in a first direction against the coupling, when the trunnion is screwed onto the nut, and
   wherein a slotted stop ring housed in an annular groove formed on the external face of the nut forms an axial abutment against the coupling in a direction opposing the first direction, allowing removal of the trunnion from the coupling by unscrewing the nut.

2. The engine as claimed in claim 1, wherein a thickness of the slotted stop ring is less than a radial spacing formed between the nut and the coupling.

3. The engine as claimed in claim 1 or 2, wherein a face of the slotted stop ring on a side of a face of the axial abutment of the coupling and the face of the axial abutment of the coupling are truncated, so as to prevent opening of the slotted stop ring when the ring is in abutment against the axial abutment surface of the coupling.

4. The engine as claimed in claim 3, wherein the slotted stop ring comprises on a side opposing the preceding side a flange in the cylindrical extension forming a positioner and facilitating removal of the ring.

5. The engine as claimed in claim 1, wherein the trunnion comprises a cylindrical end portion covering the slotted stop ring so as to hold the stop ring in the groove.

6. The engine as claimed in claim 1, wherein the coupling is part of a mechanical power take-off bevel pinion for driving auxiliary equipment of the engine.

7. The engine as claimed in claim 6, wherein the trunnion is at an end of a high pressure compressor in a double-bodied engine.

8. The engine as claimed in claim 7, wherein the trunnion of the compressor is shrink-fitted inside the coupling of the bevel pinion.

9. A method for installing the upstream end trunnion of the high pressure compressor in said bearing of the engine of claim 8, comprising the following steps:
   installing the nut in the coupling of the pinion;
   inserting the stop ring into the groove of the nut;
   axial flanging of the nut;
   engaging the trunnion of the compressor; and
   screwing the nut inside the trunnion whilst exerting an axial thrust upstream onto the trunnion until brought into abutment.

10. The method as claimed in claim 9, further comprising of heating the coupling of the bevel gear before the engagement of the end trunnion of the compressor shaft.

11. The method as claimed in one of claim 9 or 10, further comprising installation of a nut lock.

12. A method of removing the trunnion of the compressor, after installation as claimed in claim 9, comprising the following steps:
   axial locking of the end trunnion of the compressor;
   unscrewing the nut, until the stop ring is in abutment against the pinion;
   axial flanging of the nut; and
   unscrewing the nut until completely disengaging the end trunnion of the compressor, whilst exerting an axial thrust to the rear on the trunnion.

* * * * *